(12) United States Patent
Nitsche

(10) Patent No.: US 8,029,222 B2
(45) Date of Patent: Oct. 4, 2011

(54) PUSH-PIN FASTENING SYSTEM

(75) Inventor: Olaf Nitsche, Rochester Hills, MI (US)

(73) Assignee: Zephyros, Inc., Romeo, MI (US)

( * ) Notice: Subject to any disclaimer, the term of this patent is extended or adjusted under 35 U.S.C. 154(b) by 339 days.

(21) Appl. No.: 12/405,481

(22) Filed: Mar. 17, 2009

(65) Prior Publication Data

US 2010/0021267 A1  Jan. 28, 2010

Related U.S. Application Data

(60) Provisional application No. 61/083,355, filed on Jul. 24, 2008.

(51) Int. Cl.
*F16B 19/00* (2006.01)

(52) U.S. Cl. .................. 411/510; 511/508

(58) Field of Classification Search .......... 411/508–510, 411/913; 24/297
See application file for complete search history.

(56) References Cited

U.S. PATENT DOCUMENTS

| | | | |
|---|---|---|---|
| 3,810,279 A | 5/1974 | Swick et al. | |
| 3,939,752 A * | 2/1976 | Koscik | 411/548 |
| 4,728,238 A * | 3/1988 | Chisholm et al. | 411/510 |
| 4,922,596 A | 5/1990 | Wycech | |
| 4,978,562 A | 12/1990 | Wycech | |
| 5,124,186 A | 6/1992 | Wycech | |
| 5,195,859 A | 3/1993 | Thornton | |
| 5,266,133 A | 11/1993 | Hanley et al. | |
| 5,468,108 A | 11/1995 | Sullivan et al. | |
| 5,575,526 A | 11/1996 | Wycech | |
| 5,755,486 A | 5/1998 | Wycech | |
| 5,766,719 A | 6/1998 | Rimkus | |
| 5,884,960 A | 3/1999 | Wycech | |
| 5,907,891 A * | 6/1999 | Meyer | 24/453 |
| 5,932,680 A | 8/1999 | Heider | |
| 6,422,575 B1 | 7/2002 | Czaplicki et al. | |
| 6,467,834 B1 | 10/2002 | Barz et al. | |
| 6,482,486 B1 | 11/2002 | Czaplicki et al. | |
| 6,620,501 B1 | 9/2003 | Kassa et al. | |
| 6,669,426 B1 | 12/2003 | Detter et al. | |
| 6,785,533 B2 | 8/2004 | Ezuriko | |
| 6,799,931 B2 * | 10/2004 | Kwilosz | 411/510 |
| 6,890,021 B2 | 5/2005 | Bock et al. | |
| 6,920,693 B2 | 7/2005 | Hankins et al. | |
| 6,953,219 B2 | 10/2005 | Lutz et al. | |
| 6,991,237 B2 | 1/2006 | Kassa et al. | |
| 7,105,112 B2 | 9/2006 | Czaplicki et al. | |
| 7,125,561 B2 | 10/2006 | Sackler | |
| 7,199,165 B2 | 4/2007 | Kassa et al. | |
| 7,249,415 B2 | 7/2007 | Larsen et al. | |
| 7,290,828 B2 | 11/2007 | Kosal et al. | |

FOREIGN PATENT DOCUMENTS

WO  00/27920 A1  5/2000

* cited by examiner

*Primary Examiner* — Gary Estremsky
(74) *Attorney, Agent, or Firm* — Dobrusin & Thennisch PC

(57) ABSTRACT

A fastening system and method of use is disclosed. The fastening system includes a substrate, an aperture and a fastener. The fastener includes flexible wings that allow for insertion of the fastener into an aperture of a vehicle component.

20 Claims, 3 Drawing Sheets

PUSH-PIN FASTENING SYSTEM

CLAIM OF PRIORITY

The present application claims the benefit of the filing date of U.S. Provisional Application Ser. No. 61/083,355 filed Jul. 24, 2008 and the entirety of the contents of this application being hereby expressly incorporated by reference.

FIELD OF THE INVENTION

The present invention is directed toward a fastening system, and more particularly, to a fastening system employing a fastener of the type generally referred to as a "push-pin" or "christmas-tree" fastener.

BACKGROUND OF THE INVENTION

Push-pin and christmas-tree fasteners are well known within the art. These fasteners are designed for secure fit and difficult removal while at the same time allowing for easy insertion.

A particular challenge in using these types of fasteners, especially in the automotive field, lies in providing a fastener that will afford the most secure attachment in combination with the simplest insertion process and fewest additional parts or insertion steps. Often, improper insertion direction results in loose fit and the risk of separation. Additionally, there is a need for fasteners that can prevent a fastened part from pivoting about the fastener, without the need for additional fasteners or attachments.

Other problems include the difficulty in maintaining the fastener centered within an aperture so that it may have less of a tendency to loosen within the aperture or slip out of the aperture completely. A fastener with a basic rounded shank runs the risk of separation with any aperture that is not circular and of similar diameter.

The prior art includes many christmas-tree type fasteners. U.S. Pat. No. 3,810,279 discloses a drive fastener having a head, polygonal shaft and axially staggered wings along the shaft. U.S. Pat. No. 4,728,238 discloses another drive fastener having a head, polygonal shank and wings arranged along the shank. U.S. Pat. No. 5,468,108 discloses a spiral tree-fastener having a head and a flattened shank, wherein the shank contains a plurality of flexible wings arranged at an oblique angle with respect to the fastener axis.

One problem that arises with the use of some existing fastener structures is that their size and shape do not allow for ideal fit and security within an aperture. This unfortunately results in slipping and disengagement of the fasteners. Further, most push-pin fasteners are not capable of providing secure fastening to a multi-layer substrate, nor do they have the capability of fastening substrates with a wide variety of thicknesses with one standard fastener.

As another problem, many push-pin fasteners provide no means to ensure that the fastener is inserted in the ideal position to ensure maximum secure fit. As such, fasteners that are inserted upside-down, sideways or at any other imperfect position, are again subject to rotation, slippage, disengagement, or at the very least, abnormally difficult insertion. Those fasteners that are circular in nature and thus not subject to improper insertion direction often fail to fit securely within any non-circular aperture, resulting in slippage and disengagement.

A further issue with many fasteners is that multiple fasteners or additional attachments are often required to prevent slippage, disengagement, or a fastened part from twisting about a fastener. This results in increased parts, labor, and maintenance.

The present invention addresses one or more of the above problems, and represents an improvement to existing fasteners for use within vehicles. Accordingly, a fastening system for a vehicle component is disclosed. The fastener typically includes a head or cap and a shank with at least two side walls. At least one of the side walls is typically lined with wing structures. The fastening system further includes a complimentary shaped aperture within a substrate as part of a vehicle component.

SUMMARY OF THE INVENTION

In a first aspect, the present invention contemplates a fastening system for a vehicle component, comprising: one or more substrate layers wherein the substrate layers have a top and bottom; a polygonal shaped aperture within each of the one or more substrate layers, wherein the aperture has at least two non-parallel opposing walls so that the aperture is non-symmetrical across one axis; a fastener for insertion through the aperture, wherein the fastener includes: a cap surface; a shank extending from the cap surface in the direction of a longitudinal axis wherein the shank includes at least two side walls disposed about the longitudinal axis and the at least two side walls include at least two non-parallel opposing walls so that the shape of the fastener corresponds to the shape of the aperture; a plurality of flexible wings extending outwardly from at least one side wall of the at least two side walls, wherein the plurality of flexible wings are arranged at an acute angle in relation to the longitudinal axis; wherein the plurality of flexible wings are of sufficient number and sufficient flexibility so that at least one flexible wing is in contact with the top of the one or more substrate layers and at least one flexible wing is in contact with the bottom of the one or more substrate layers.

This aspect may be further characterized by one or any combination of the following features: the polygonal shaped aperture includes two parallel opposing walls and two non-parallel opposing walls and the fastener includes two parallel opposing side walls and two non-parallel opposing side walls; the plurality of flexible wings are located on at least two side walls of the fastener; there are no flexible wings on the two parallel opposing side walls; the walls of the aperture and the side walls of the fastener are arranged so that they form complimentary isosceles trapezoids, wherein the fastener is capable of secure entry into the aperture; the shank includes a portion; the end of the shank opposite the cap surface narrows; each side wall that contains wings includes at least one wing; each side wall that contains wings includes two distinct sets of adjacent wings so that the two distinct sets of adjacent wings are arranged in a staggered formation.

In another aspect, the present invention contemplates a fastening system for a vehicle component, comprising: one or more substrate layers; a trapezoidal shaped aperture within each of the one or more substrate layers, wherein the aperture has two non-parallel opposing side walls so that the aperture is non-symmetrical across one axis; a fastener for insertion through the aperture, wherein the fastener includes: a cap surface; a shank extending from the cap surface in the direction of a longitudinal axis wherein the shank includes four side walls disposed about the longitudinal axis and the four side walls include two non-parallel opposing walls so that the shape of the fastener corresponds to the shape of the aperture; at least one flexible wing extending outwardly from each of at least one of the four side walls, wherein the at least one flexible wing is arranged at an acute angle in relation to the longitudinal axis; wherein the at least one flexible wing is of sufficient number and sufficient flexibility so that the at least one flexible wing is in contact with the one or more substrate layers so that the contact securely engages the at least one flexible wing.

This aspect may be further characterized by one or any combination of the following features: each side wall that contains wings includes two distinct sets of adjacent wings so that the two distinct sets of adjacent wings are located in a staggered arrangement; the plurality of flexible wings overlap with any vertically adjacent flexible wings during insertion through an aperture; the one or more substrate layers includes a layer of molded nylon; the fastener is integrated into one or more of the one or more substrate layers and the cap is eliminated; upon insertion into the aperture, the cap surface remains in contact with the top of the one or more substrate layers and all flexible wings have traversed the aperture.

In a further aspect, the present invention contemplates an automotive baffle, reinforcement, or seal comprising a trapezoidal shaped aperture placed within a body of the baffle, reinforcement or seal, wherein the aperture extends through all layers of the baffle, reinforcement or seal; and a trapezoidal shaped tree fastener placed within the aperture where two opposing walls are non-parallel and two opposing walls are parallel so that the fastener can only be placed within the aperture in one direction so that each wall of the four walls must engage a corresponding side of the aperture.

In another aspect, the present invention contemplates a method of using a fastening system comprising: providing a vehicle component having one or more substrate layers wherein the substrate layers have a top and bottom; providing a trapezoidal shaped aperture within each of the one or more substrate layers, wherein the aperture has two non-parallel opposing walls so that the aperture is non-symmetrical across one axis; providing a fastener for insertion through the aperture, wherein the fastener includes: a cap surface; a shank extending from the cap surface in the direction of a longitudinal axis wherein the shank includes four side walls disposed about the longitudinal axis and the four side walls include two non-parallel opposing walls so that the shape of the fastener corresponds to the shape of the aperture; a plurality of flexible wings extending outwardly from at least one of the four side walls; inserting the fastener into the aperture such that at least one flexible wing is in contact with the top of the one or more substrate layers and at least one flexible wing is in contact with the bottom of the one or more substrate layers.

DETAILED DESCRIPTION

Figure 1:
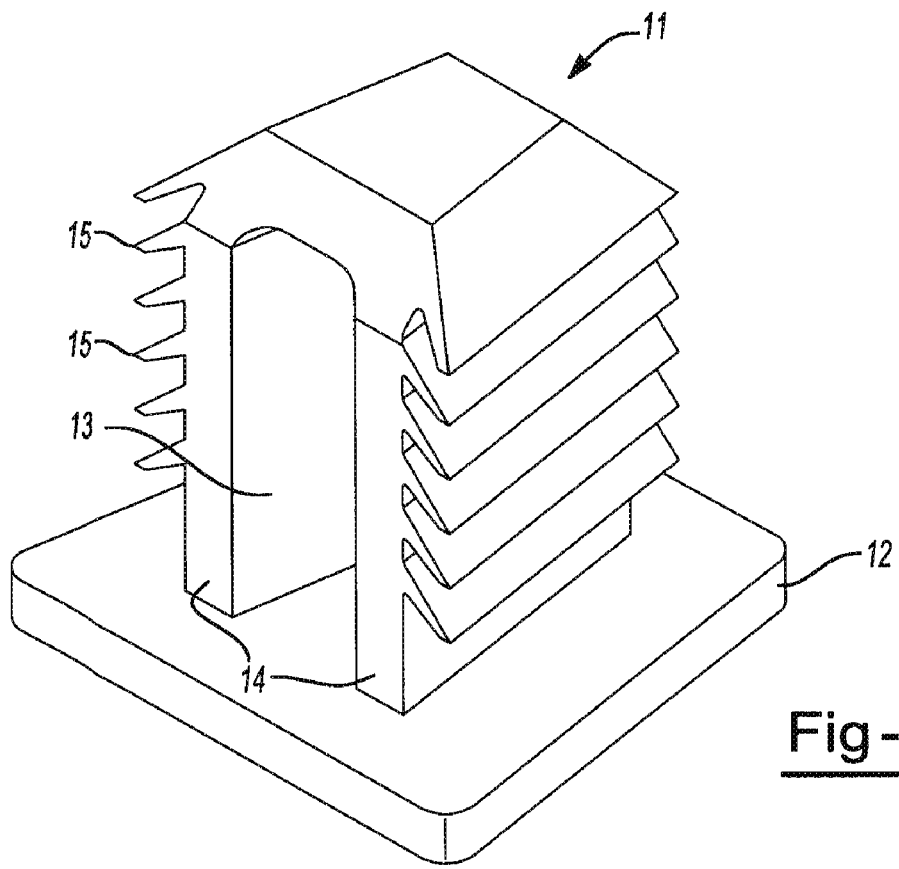
FIG. 1 is an isometric view of an embodiment of the fastener of the present invention.
Figure 2:
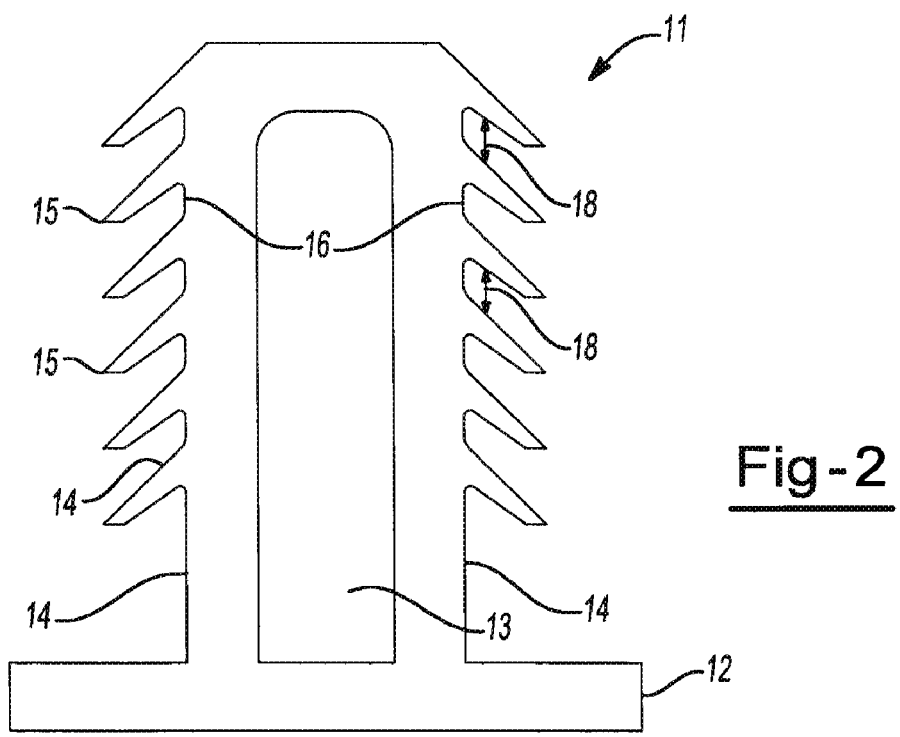
FIG. 2 is a cross-sectional view of another embodiment of the fastener of the present invention.
Figure 3:
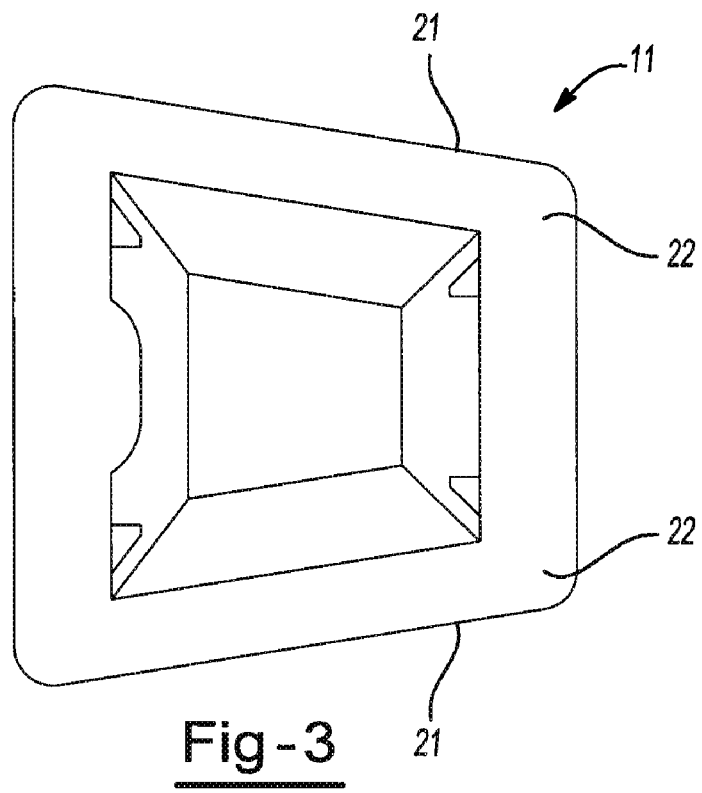
FIG. 3 is a perspective bottom view of the embodiment of the fastener shown at FIG. 1.

With reference to FIGS. 1-3, there is illustrated an exemplary fastener 11 of the fastening system of the present invention. In the embodiment shown, the fastener 11 includes a cap surface 12, a shank portion 13, four side walls 14 defining the shank portion 13 and six flexible wings 15 extending from two of the four side walls. However, it is contemplated that the fastener may include fewer or greater than four side walls and fewer or greater than 6 flexible wings extending along the side walls of the shank portion and that the flexible wings may be located on all or less than all of the side walls.

The cap surface 12 is shown as being substantially flat and of larger surface area than any remaining cross section of the shank portion. However, the cap surface may also be conical, triangular, or any other non-flat shape so long as the area of the cap is large enough to prevent slippage of the cap through a corresponding aperture. The cap surface may be separate from or integrated with the shank portion.

The shank portion 13 is being shown as having four side walls wherein at least two of the side walls are lined with flexible wings. However, any number of the side walls may also contain flexible wings. The flexible wings may all be of equal thickness, or the thickness of each row of flexible wings or each flexible wing individually may differ. Similarly, the flexible wings may be of equal lengths, or each row of flexible wings or each flexible wing individually may be of different lengths.

FIG. 1 is an isometric view of one embodiment of the fastener 11 of the fastening system of the present invention. Flexible wings 15 can be seen on two walls of the shank 13. Preferably, each of the flexible wings are of equal length and each flexible wing intersects the shank so that the flexible wings are not attached to the shank in a spiral fashion. Each of the flexible wings may be arranged at an angle such that the terminating end of each wing points toward the cap surface 12. Preferably, no portion of any flexible wing extends outwardly from the shank beyond the maximum extent of the cap portion. The flexible wings are designed to interact with the walls of the aperture within the one or more substrate layers, wherein the radius of the aperture is smaller than any radius of the cap portion and smaller than any radius measured from a center on the shank to a termination point of a flexible wing. The radius from a center on the shank to a termination point of a flexible wing is preferably larger than that of a corresponding aperture to allow the flexible wings to flex against any substrate surface surrounding the aperture and to snap out behind any substrate surface surrounding the aperture, so that the push-pin fastener may remain immovably fixed within that aperture.

The shape of the side walls that are disposed about the shank 13 may result in a narrow portion of the fastener and a wide portion of the fastener and corresponding narrow and wide portions of the aperture, especially if the fastener and corresponding aperture are trapezoidal in shape. When the fastener is used in combination with an aperture that embodies both a wide portion and a narrow portion the fastener may be inserted in only one direction, so that the narrow portion of the aperture corresponds with the narrow portion of the fastener. This ensures that the fastener is inserted in the direction that allows for the most secure fit. The embodiment including a trapezoidal fastener and corresponding aperture also allows for fastening to a substrate or multiple substrates with only one fastener, whereas multiple fasteners would generally be required to prevent pivoting of the substrate around a single fastener. When one side of the fastener and corresponding aperture is longer than an opposing parallel side, a substrate is stabilized and pivoting is prevented with only a single fastener.

Preferably, the side walls of the fastener and corresponding aperture are both trapezoidal and isosceles in nature, so that the two non-parallel walls 21 of the fastener and aperture are of equal length and the base angles 22 are equal as well. In preferred embodiments, the two side walls of the fastener and aperture that are parallel exist in a ratio of 2:1 such that one side wall is about twice the length of the opposing side wall. Generally, that same ratio may range from about 1.5:1 to about 4:1.

Turning now to FIG. 2, which is a cross-sectional view of the fastener 11. The shank 13 has a width measured between opposite corners 16. That width may be substantially equal to or smaller than the diameter of the corresponding aperture. In preferred embodiments, the height of the fastener as measured from the cap to the opposite end of the fastener is between about 5 mm to about 30 mm. More preferably, the height is between about 10 mm to about 20 mm. Most preferably, the height of the fastener is about 15 mm.

The width of the cap at its widest point ranges from about 2 mm and about 30 mm. More preferably, the width of the cap at its widest point ranges from about 5 mm to about 12 mm and most preferably is about 10 mm. The length of the cap is between about 5 mm to about 30 mm. More preferably, the length is between about 5 mm to about 15 mm. Most preferably, the length of the cap is about 10 mm. In preferred embodiments, the ratio of the length of the shaft to the length of the cap may range from 4:1 to 1:1, or the length of the shaft may be less than the length of the cap. Preferably, the ratio of the length of the shaft to the length of the cap is from about 2:1 to about 1:1.

The distance between each row of flexible wings 18 may be consistent or may vary from row to row. Preferably, the distance between two rows of flexible wings ranges from about 0.5 mm to about 3 mm. More preferably, the distance between two rows of wings ranges from about 1 mm to about 2 mm. The distance between the cap and the first row of flexible wings ranges from about 0.5 mm to about 3 mm. More preferably, the distance between the cap and the first row of flexible wings ranges from about 1 mm to about 2 mm. The distance between the rows of flexible wings may be consistent along the shank or may vary from row to row. The distance from the cap to a tip of one flexible wing as compared to the distance from the cap to the tip of a corresponding flexible wing on an adjacent or opposite wall may not be equidistant, resulting in a staggered positioning of the flexible wings about the fastener. In preferred embodiments, the angle between a row of flexible wings and the shaft ranges from about 10° to about 90°. More preferably, the angle ranges from about 45° to about 90°. Preferably, the flexible wings which pass completely through the aperture during insertion will be released from flexing and will reassume their position at the predetermined angle toward the cap surface on the underside of the surface surrounding the aperture.

FIG. 3 shows a view of the fastener from the end opposite the cap surface. Preferably, the end of the shank that first enters the aperture may also be trapezoidal in shape.

The present fasteners may be injection molded from any of the polymeric resin, or any plastic or other materials commonly used for the manufacture of tree fasteners. A polyamide or any thermoplastic polymer that can be injection molded or possibly extruded may be used. Any molded thermoset material may also be used.

Figure 4:
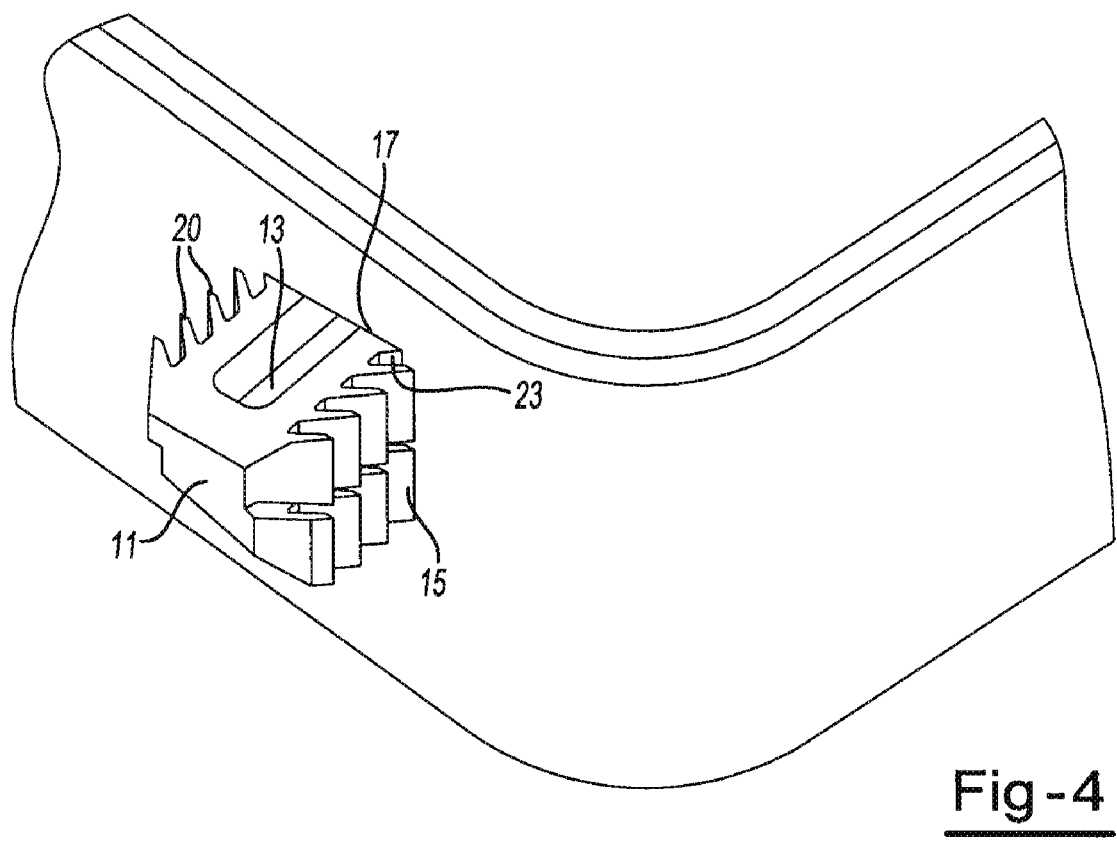
FIG. 4 shows one embodiment of the fastening system of the present invention, wherein the embodiment shows an automotive baffle.

Turning now to FIG. 4 which shows placement of the fastener within the corresponding aperture of a substrate shown here as an automotive baffle. Preferably, portions 20 of the flexible fins 15 lie beyond the outer edge of the aperture 17. This characteristic of the flexible fins provides the fastener with the ability to remain fixed within an aperture having an area smaller than that of the cross section of the widest point on the shank without rotating or rattling. The trapezoidal shape of the fastener further stabilizes the fastened part by preventing pivoting around the fastener.

The flexible wings 15 are preferably included in sufficient number and spacing that a set of fins may be flexed inside the aperture to discourage slippage and disengagement. The substrate thickness and the distance 23 between one row of flexible wings and an adjacent row of flexible wings may allow for the substrate to fit in the space between two adjacent rows of flexible wings. Consequently, the spacing of the flexible wings results in a tight fit for substrates over a wide range of thicknesses.

In preferred embodiments, the shank has a midsection that may be exposed at one wall, such that the shank may maintain flexibility. The shape of the shank is designed to keep the fastener centered within the aperture, thereby maximizing the contact made by the flexible wings with the substrate surface surrounding the aperture to reduce the likelihood of slippage, disengagement, or pivoting of a fastened part about the fastener.

The insertion force, retention force and removal force of the fastener may be predetermined by varying its design parameters. The limitations which will determine the insertion force include the amount of flexibility imparted on the flexible wings, which is determined by the type and gauge of the material used to construct the flexible wings. Further, the angle at which the flexible wings are attached to the shank will affect the insertion force, a smaller angle requiring less force, a larger angle requiring more force. Several factors will increase the retention force. By selecting a thick-gauge sturdy material for the flexible wings, the retention force will increase, as the gauge and strength of the selected material increases. However, a material that is too thick or too strong may result in insertion or retention forces that are stronger than desired. Further, as the length of the flexible wings increases, the retention forces may increase as well. An increase in the angle at which the flexible wings are attached to the shank may result in additional increase in retention force.

Figure 5:
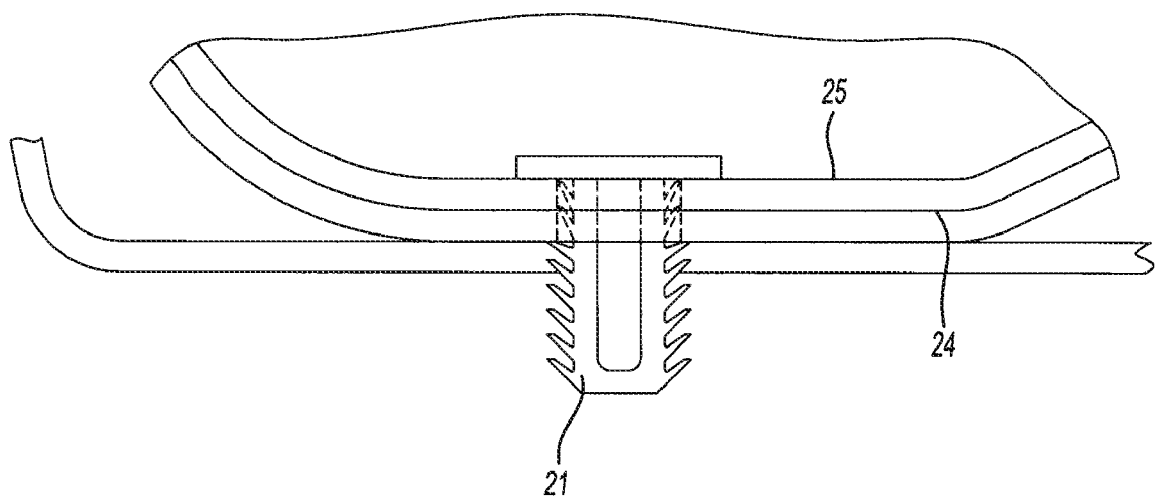
FIG. 5 shows an additional embodiment of the fastening system of the present invention, including a multi-layer substrate.

As can be seen in FIG. 5, the substrate layers may include one or more layers of a carrier material 24. The carrier is preferably configured to extend along an axis and includes at least a first end and a second end which reside on opposite ends of the axis. The carrier may also include one or more cavities which extend along the length or axis of the carrier. The carrier can be straight or contoured along its length.

The carrier is formed of one or more walls that extend along the length of the carrier, which may be joined or otherwise integrated together. The carrier may have separate pieces that are separately made and then assembled together, it may be integrally formed, or both. Optionally, it is contemplated that the one or more of the walls may be internal walls located substantially within exterior walls of the carrier. Preferably, upon joining of the walls, the carrier forms one or more (or a plurality) of cavities (e.g., 1, 2, 3, 4, 5, 6 or more cavities) that extend along at least a portion of the length of the carrier and more preferably the entire length. It is contemplated that the one or more cavities may form openings extending through the carrier between the first and second ends of the carrier, thereby allowing the passage of fluids or other components through the carrier.

Optionally, the carrier may include one or more through holes formed in the walls of the carrier. One or more of the through holes may be shaped as polygonal (e.g., trapezoidal) apertures for engaging one or more complimentary fasteners of the present invention. The through holes may provide reduced weight of the carrier. The through holes may also be used to directly control any flow of activatable substrate layers, or otherwise.

The carrier may be formed of any of a variety of materials and can be formed of a single material or multiple materials. As examples, the carrier may be formed of polymeric materials (e.g., thermoplastics such as polyamide), metals (e.g., aluminum, steel, magnesium, metal alloys) combinations thereof or the like. As will be recognized, the technique for forming and shaping the carrier will typically depend upon the material of the carrier. Examples of techniques include, without limitation, molding (e.g., injection, compression or blow molded), stamping, hydroforming, extruding or otherwise. Examples of suitable materials and forming processes can be found in commonly owned U.S. Pat. No. 6,467,834, to Barz et al., the entire contents of which are herein incorporated by reference for all purposes.

In further reference to FIG. 5, one or more substrate layers may include a sealant or adhesive material 25 (or any material that acts as a sealant and adhesive) which may or may not be expandable. The sealant or adhesive material may comprise a non-activatable material, an activatable material or a combination of both. For example, the sealant or adhesive material may comprise a non-activatable material which undergoes little to no physical or chemical change upon application of energy. Alternatively, the sealant or adhesive material may comprise an activatable material which does undergo physical and/or chemical change upon application of energy, as described herein. Still further, it is further contemplated that only a portion of the sealant or adhesive material may be activatable.

Preferably, the sealant or adhesive material comprises or includes an activatable material to cause sealing. More preferably, the sealant or adhesive material comprises a heat activatable material configured to expand upon application of energy (such as heat or otherwise). The thickness of the sealant or adhesive material may vary depending upon a number of factors such as whether and to what level the sealant or adhesive material is activatable or expandable. The thickness may also be dependent upon the volume of open space to be filled. Still further, the thickness may be based upon the pliability of the sealant or adhesive material. Examples of suitable thicknesses include between about 0.5 to 10 mm or between about 1 to 5 mm or otherwise.

If the sealant or adhesive material is expandable, it may be formed of several different materials. Generally speaking, the member may utilize technology and processes for the forming and applying the expandable material such as those disclosed in U.S. Pat. Nos. 4,922,596; 4,978,562; 5,124,186; 5,884,960; 6,467,834; 6,482,486 and 7,199,165 all of which are expressly incorporated by reference for all purposes.

The sealant or adhesive material may be generally dry to the touch or tacky and can be placed upon another substrate or within a vehicle cavity or the like in any form of desired pattern, placement, or thickness, but is preferably of substantially uniform thickness. Examples of other suitable tacky or non-tacky materials include L-2663, L-2610, L-2609, L-2701, L-2820, L-5520 or other similar material available through L&L Products, Inc. of Romeo, Mich.

In applications where the adhesive or sealing material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an assembly plant, when the foam is processed along with the automobile components at elevated temperatures or at higher applied energy levels, e.g., during paint curing steps. While temperatures encountered in an automobile assembly operation may be in the range of about 130° C. to 205° C. (about 300° F. to 400° F.), body and paint shop applications are commonly about 93.33° C. (about 200° F.) or slightly higher. Similarly, during manufacturing of other transportation device (e.g., bicycle, motorcycles, all terrain vehicles or otherwise), higher temperatures may also be used during paint curing process (such as powder coat applications) or otherwise. In one configuration, the material becomes reactive at temperatures greater than about 120° C., or greater than about 150° C. or even greater than about 160° C. If needed, blowing agent activators can be incorporated into the composition to cause expansion at different temperatures outside the above ranges.

By specific example, it is contemplated that the material may be cured in a powder coat paint cure operation. In such an operation, the material may be exposed to a temperature range between approximately 120°-230° C. with an exposure time between about 10 minutes to 60 minutes. Also, it is contemplated that the material may be cured in a precipitation hardening cure operation. In this operation, the material may be exposed to a temperature range between approximately 150°-230° C. with an exposure time between about 45 minutes to 8 hours.

Generally, suitable expandable foams have a range of expansion ranging from approximately 0 to over 1000 percent. The level of expansion of the expandable material may be increased to as high as 2000 percent or more. Typically, strength and stiffness are obtained from products that possess lower expansion.

Some other possible materials for the expandable material include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference).

In another embodiment, the expandable material is provided in an encapsulated or partially encapsulated form, which may comprise a pellet, which includes an expandable foamable material, encapsulated or partially encapsulated in an adhesive shell. An example of one such system is disclosed in U.S. Pat. No. 6,422,575 hereby incorporated by reference.

The fastening system of the present invention may be used in place of any so-called tree fastener, so long as the corresponding aperture is of appropriate size and shape. Preferably, the fastening system of the present invention is suitable for substantial variation in substrate thicknesses while still providing secure fastening.

The fastening system of the present invention may be used for attachment purposes within the automotive field, specifically as part of an automotive baffle, reinforcement or sealing material. Examples of these components are disclosed in U.S. Pat. Nos. 7,290,828; 7,249,415; 7,125,561; 7,105,112; 6,991,237; 6,953,219; 6,920,693; 6,890,021; 6,785,533; 6,620,501; and others. They can also be used in other applications where tree fasteners are currently used.

In summary, the fastening system of the present invention has as advantages: a smooth installation; low insertion and high retention forces; the ability to effectively secure a wide range of substrate layers and corresponding substrate thicknesses; the ability to be customized to meet the specific needs of an application; the appropriate shape to ensure ideal insertion direction and to reduce the need for additional fasteners to prevent pivoting; ease in manufacture and tooling; low cost; self-centering; and consistency.

Modifications to the present fasteners would be obvious to those of ordinary skill in the art, but would not bring the fastener so modified beyond the scope of the claims to follow. It is therefore to be understood that within the scope of the appended claims, the present invention may be practiced otherwise than as specifically described herein.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A fastening system for a vehicle component, comprising:
   one or more substrate layers wherein the substrate layers have a top and bottom;
   a polygonal shaped aperture within each of the one or more substrate layers, wherein the aperture has at least two non-parallel opposing walls so that the aperture is non-symmetrical across one axis;
   a fastener for insertion through the aperture, wherein the fastener includes:
   i. a cap surface;
   ii. a shank extending from the cap surface in the direction of a longitudinal axis wherein the shank includes at least two side walls disposed about the longitudinal axis and the at least two side walls include at least two non-parallel opposing walls so that the shape of the fastener corresponds to the shape of the aperture;
   iii. a plurality of flexible wings extending outwardly from at least one side wall of the at least two side walls, wherein the plurality of flexible wings are arranged at an acute angle in relation to the longitudinal axis;
   wherein the plurality of flexible wings are of sufficient number and sufficient flexibility so that at least one flexible wing is in contact with the top of the one or more substrate layers and at least one flexible wing is in contact with the bottom of the one or more substrate layers.

2. The fastening system of claim 1, wherein the polygonal shaped aperture includes two parallel opposing walls and two non-parallel opposing walls and the fastener includes two parallel opposing side walls and two non-parallel opposing side walls.

3. The fastening system of claim 2, wherein the plurality of flexible wings are located on at least two side walls of the fastener.

4. The fastening system of claim 2, wherein there are no flexible wings on the two parallel opposing side walls.

5. The fastening system of claim 2, wherein there are no flexible wings on the two non-parallel opposing side walls.

6. The fastening system of claim 1, wherein the walls of the aperture and the side walls of the fastener are arranged so that they form complimentary isosceles trapezoids, wherein the fastener is capable of secure entry into the aperture.

7. The fastening system of claim 1, wherein the end of the shank opposite the cap surface narrows.

8. The fastening system of claim 1, wherein each side wall that contains wings includes at least three wings.

9. The fastening system of claim 3, wherein each side wall that contains wings includes two distinct sets of adjacent wings so that the two distinct sets of adjacent wings are arranged in a staggered formation.

10. A fastening system for a vehicle component, comprising
    one or more substrate layers;
    a trapezoidal shaped aperture within each of the one or more substrate layers, wherein the aperture has two non-parallel opposing walls so that the aperture is non-symmetrical across one axis;
    a fastener for insertion through the aperture, wherein the fastener includes:
    i. a cap surface;
    ii. a shank extending from the cap surface in the direction of a longitudinal axis wherein the shank includes four side walls disposed about the longitudinal axis and the four side walls include two non-parallel opposing side walls so that the shape of the fastener corresponds to the shape of the aperture;
    iii. at least one flexible wing extending outwardly from at least one of the four side walls, wherein the at least one flexible wing is arranged at an acute angle in relation to the longitudinal axis;
    wherein the at least one flexible wing is of sufficient number and sufficient flexibility so that the at least one flexible wing is in contact with the one or more substrate layers so that the contact securely engages the at least one flexible wing.

11. The fastening system of claim 10, wherein each side wall that contains wings includes two distinct sets of adjacent wings so that the two distinct sets of adjacent wings are located in a staggered arrangement.

12. The fastening system of claim 10, wherein the plurality of flexible wings overlap with any vertically adjacent flexible wings during insertion through an aperture.

13. The fastening system of claim 11, wherein the plurality of flexible wings overlap with any vertically adjacent flexible wings during insertion through an aperture.

14. The fastening system of claim 10, wherein the one or more substrate layers include a layer of sealing material.

15. The fastening system of claim 10, wherein the one or more substrate layers includes a layer of molded nylon.

16. The fastening system of claim 10, wherein the fastener is integrated into one or more of the one or more substrate layers and the cap is eliminated.

17. The fastening system of claim 13, wherein the fastener is integrated into one or more of the one or more substrate layers and the cap is eliminated.

18. The fastening system of claim 10, wherein upon insertion into the aperture, the cap surface remains in contact with the top of the one or more substrate layers and all flexible wings have traversed the aperture.

19. An automotive baffle, reinforcement, or seal comprising:
    a trapezoidal shaped aperture placed within a body of the baffle, reinforcement or seal, wherein the aperture extends through all layers of the baffle, reinforcement or seal: and a trapezoidal shaped tree fastener placed within the aperture where two opposing walls are non-parallel and two opposing walls are parallel so that the fastener can only be placed within the aperture in one direction so that each wall of the four walls must engage a corresponding side of the aperture.

20. A method of using a fastening system comprising:

providing a vehicle component having one or more substrate layers wherein the substrate layers have a top and bottom;

providing a trapezoidal shaped aperture within each of the one or more substrate layers, wherein the aperture has two non-parallel opposing walls so that the aperture is non-symmetrical across one axis;

providing a fastener for insertion through the aperture, herein the fastener includes:

i. a cap surface:

ii. a shank extending from the cap surface in the direction of a longitudinal axis wherein the shank includes four side walls disposed about the longitudinal axis and the four side walls include two non-parallel opposing walls so that the shape of the fastener corresponds to the shape of the aperture;

iii a plurality of flexible wings extending outwardly from at least one of the four side walls;

inserting the fastener into the aperture such that at least one flexible wing is in contact with the top of the one or more substrate layers and at least one flexible wing is in contact with the bottom of the one or more substrate layers.

* * * * *

UNITED STATES PATENT AND TRADEMARK OFFICE
CERTIFICATE OF CORRECTION

| | | |
|---|---|---|
| PATENT NO. | : 8,029,222 B2 | Page 1 of 1 |
| APPLICATION NO. | : 12/405481 | |
| DATED | : October 4, 2011 | |
| INVENTOR(S) | : Olaf Nitsche | |

It is certified that error appears in the above-identified patent and that said Letters Patent is hereby corrected as shown below:

Column 11 of Claim 20, line 16, "herein the fastener includes:" should read:

--wherein the fastener includes:--.

Signed and Sealed this
Twenty-ninth Day of November, 2011

David J. Kappos
*Director of the United States Patent and Trademark Office*